United States Patent
Gupta (10) Patent No.: US 11,210,717 B2
(45) Date of Patent: Dec. 28, 2021

(54) CUSTOMER BASED REAL-TIME AUTONOMOUS DYNAMIC PRODUCT CREATION AND RECOMMENDATION SYSTEM USING AI

(71) Applicant: Dell Products L. P., Round Rock, TX (US)

(72) Inventor: Shubham Gupta, Jaipur (IN)

(73) Assignee: Dell Products L.P., Round Rock, TX (US)

( * ) Notice: Subject to any disclaimer, the term of this patent is extended or adjusted under 35 U.S.C. 154(b) by 37 days.

(21) Appl. No.: 16/175,998

(22) Filed: Oct. 31, 2018

(65) Prior Publication Data

US 2020/0134685 A1 Apr. 30, 2020

(51) Int. Cl.
G06Q 30/06 (2012.01)
G06N 20/00 (2019.01)

(52) U.S. Cl.
CPC ......... *G06Q 30/0621* (2013.01); *G06N 20/00* (2019.01); *G06Q 30/0631* (2013.01); *G06Q 30/0635* (2013.01)

(58) Field of Classification Search
None
See application file for complete search history.

(56) References Cited

U.S. PATENT DOCUMENTS

| | | | | |
|---|---|---|---|---|
| 2006/0167757 A1* | 7/2006 | Holden | ................. | G06Q 30/06 705/27.2 |
| 2007/0073592 A1* | 3/2007 | Perry | ................. | G06Q 30/0603 705/26.1 |
| 2007/0150886 A1* | 6/2007 | Shapiro | ................. | G06F 8/63 717/174 |
| 2012/0069131 A1* | 3/2012 | Abelow | ................. | G06Q 10/067 348/14.01 |
| 2014/0214483 A1* | 7/2014 | Minnis | ................. | G06Q 30/02 705/7.29 |

FOREIGN PATENT DOCUMENTS

WO   WO-2007052285 A2 *   5/2007   ............. H04L 51/28

OTHER PUBLICATIONS

R. Fasuga, P. Stoklasa and M. Němec, "An intelligent tool for all-to-all sales on the Internet: Platform for compilation of commercial offers and requests for companies and customers," 2015 12th International Joint Conference on e-Business and Telecommunications (ICETE), 2015, pp. 263-270. (Year: 2015).*

* cited by examiner

*Primary Examiner* — Michelle T Kringen
(74) *Attorney, Agent, or Firm* — Krishnendu Gupta; Deepika Bhayana; Dorothy Wu Chiang (57) ABSTRACT

In some examples, a server may determine a browsing history associated with a user, identify activities associated with purchasing a device, and determine features of the device. Individual features may be assigned a corresponding priority based on the browsing history. A machine learning algorithm may predict a configuration of the device based on the features and the corresponding priorities. The server may create a web page that describes a specification of the device based on the configuration and includes a comparison of at least some of the features of the device with other features of similar devices. The server may send a notification with a link to the web page. The web page may enable the user to modify the configuration and modify a price of the device. The server may receive a purchase order to purchase the device and instruct a manufacturing facility to build-to-order the device.

17 Claims, 4 Drawing Sheets

CUSTOMER BASED REAL-TIME AUTONOMOUS DYNAMIC PRODUCT CREATION AND RECOMMENDATION SYSTEM USING AI

BACKGROUND OF THE INVENTION

Field of the Invention

This invention relates generally to build-to-order (BTO) devices, such as electronic devices (e.g., computing devices) and particularly to using a user's browsing history (e.g., including pre-purchase searches) as input to an artificial intelligence (AI) or machine learning algorithm to predict and create specifications for a BTO device.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A user, prior to making a purchase of an electronic device, such as a computing device (e.g., smartphone, laptop, desktop, tablet, 2-in-1, or the like), may perform extensive internet research. For example, the user may use a web browser to navigate to various manufacturer sites to (i) view specifications of various products, (ii) read online reviews of the various products, (iii) read online comparisons of the various products, and perform other research. After the user has researched the various products, the user may select and purchase one of the various products.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a server may determine a browsing history associated with a user, identify activities associated with purchasing a device, and determine features of the device. Individual features may be assigned a corresponding priority based on the browsing history. A machine learning algorithm may predict a configuration of the device based on the features and the corresponding priorities. Starting with a lower priority feature, the features may be adjusted to bring the price of the device within a particular price range. The server may create a web page that describes a specification of the device based on the configuration and includes a comparison of at least some of the features of the device with other features of similar devices in the price range. The server may send a notification with a link to the web page. The web page may enable the user to modify the configuration and modify a price of the device. The server may receive a purchase order to purchase the device and instruct a manufacturing facility to build-to-order the device.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable a server (e.g., an IHS) to predict, substantially in real time, a customized device specification, using machine learning, based on a user's browsing history. For example, a user may perform various activities (e.g., visiting product pages, reading online reviews, reading online comparisons, and the like) prior to purchasing a device. Such pre-purchase activities may be identified in the browsing history and used to determine features of interest to the user and to determine a priority of individual ones of the features. For example, the features of interest may be determined based on an amount of time the user spends selecting particular product images, which hypertext links in the product pages that the user selects, a time spent on a particular section of a product page (e.g., selecting a specification tab and scrolling down to a view a particular portion of the specification), and the like. The features and their corresponding priority may be used to create, using a machine learning algorithm, a weighted overlay. The weighted overlay may be used with conjoint analysis (or similar) data to predict, suing the machine learning algorithm, a configuration of a device that the user is likely to purchase. Many electronic devices, such as computing devices (e.g., smartphone, laptop, tablet, desktop, 2-in-1, and the like), can be manufactured on a build-to-order (BTO) basis, in which a user selects various options (e.g., processor, memory size, storage size, display size, and the like) and a manufacturer custom builds the device based on the specified options.

The systems and techniques described herein may identify a particular platform from multiple platforms and then configure the particular platform based on the preferences of the user that are determined based on analyzing the user's pre-purchase browsing history to custom design a BTO device. For example, a manufacturer may offer multiple platforms, including a consumer platform (e.g., Dell® Inspiron), a business platform (e.g., Dell® Vostro), an Enterprise platform (e.g., Dell® Latitude), an ultralight platform (e.g., Dell® XPS), a gaming platform (e.g., Dell® Alienware), a workstation platform (e.g., Dell® Precision), and the like. The consumer platform may have the cheapest price range (e.g., $200-$600), the business platform may have a higher price range (e.g., $400-$600), the Enterprise platform may have an even higher price range (e.g., $500-$1200), the ultralight platform may be more expensive still (e.g., $900-$1400), the gaming platform may have an even higher range ($1400-$2400), and the workstation platform may have the most expensive range (e.g., $900-$4,000). Thus, a price range of one platform may overlap a portion of a price range of another platform. The systems and techniques may select a particular platform based on the user's feature priorities and then configure the particular platform based on the user's feature priorities (e.g., as determined based on analyzing the user's browsing history).

In some cases, the features may be adjusted, starting with the lowest priority feature (e.g., in ascending order of priority), to modify (e.g., reduce) a price of the device configuration to be within a predetermined amount of the target (or maximum) price of the device. For example, the browsing history may indicate that the user is searching for devices having a price less than $1,000 (e.g., target price). The initial predicted configuration of the device may have an associated price of $1200. A configuration algorithm may repeatedly adjust the features of the configuration, starting with the lowest priority feature, until the associated price of the modified configuration is within a predetermined threshold (e.g., 10%, 5%, 3%, 1% or the like) of the target (or maximum) price. The threshold may be plus or minus the target price. For example, if the target price is $1000 and the threshold is 5%, then the configuration algorithm may stop when the price is between $950 and $1050. To illustrate, the adjustments may include reducing the number of ports, configuring the device with slower ports (e.g., USB 2.0 rather than USB 3.0 ports), or other modifications to low priority features. If the modified configuration has an associated price that is within the predetermined threshold of the target (or maximum) price, then no further adjustments may be made. If the modified configuration has an associated price that is greater than the predetermined threshold from the target (or maximum) price, then the features may continue to be adjusted (e.g., starting with the next lowest priority feature) to determine if the adjustments result in lowering the associated price of the modified configuration to within the predetermined threshold of the target (or maximum) price. In some cases, the adjustments to the features may include switching from one platform to another platform. For example, an Enterprise platform (e.g., Dell® Latitude) may offer USB 3.0 ports while a business platform (e.g., Dell® Vostro) may offer USB 2.0 ports. To modify features and reduce costs, the server may switch from the Enterprise platform to the business platform. In this way, the price of the configuration may be repeatedly adjusted, starting with the lowest priority features, to bring the price of the predicted configuration closer to the target (or maximum) price of the user.

The server may create a web page detailing the specifications of the predicted (and in some cases modified) configuration of the device. The server may perform a comparison of the features (e.g., particularly the primary and secondary features) of the device to other features of similar (e.g., competing) devices and include the comparison in the web page. The server may send a notification with a link to the web page to a browser associated with the user (e.g., via email or a push notification). If the user decides to purchase the custom configured device described on the web page, the server may receive an order to acquire (e.g., purchase of lease) the custom configured device and may send an instruction to a build-to-order (BTO) facility to build the device accordingly.

Thus, a browsing history of a user may be analyzed to identify activities researching the purchase of a particular type of device (e.g., a laptop or other computing device). The activities may be analyzed to identify features and a priority associated with each of the features. The priority of the features may be used to create a weighted overlay using a type of machine learning (e.g., conjoint analysis or similar) that is used to predict specifications of a device that the user is likely to purchase. The features may be repeatedly adjusted, starting with the lowest priority features, until the price of the device is within a predetermined amount from a target (or maximum) price (or within a price range) that the user desires to pay. In some cases, the adjustments may include changing from a first platform to a second platform to adjust the features and to adjust (e.g., lower) the price. A web page that includes a description (e.g., specification) of the configuration of the device may be created. The web page may include comparison information comparing the features (e.g., particularly the primary and secondary features) of the device with similar devices (e.g., offered by competing manufacturers). A notification with a link to the web page may be provided to the user to enable the user to view the specifications and the comparison information. The web page may enable the user to further modify the configuration. For example, the configuration presented in the web page may be slight below or slight above the target (or maximum) price that the user desires to pay. However, after viewing the configuration, the user may decide to pay slightly more than the target (or maximum) price and modify the configuration to obtain a device with a modified configuration that includes one or two additional priorities. For example, the user's priorities may have changed between a point in time when the browsing history was obtained and a later point in time when the user views the web page. The user may place an order for the device. In response to the order, the device may be built to order based on the configuration and shipped to the user.

As an example, a server may include one or more processors and one or more non-transitory computer readable media storing instructions executable by the one or more processors to perform various operations. For example, the operations may include determining (e.g., receiving or retrieving) a browsing history associated with a user. The browsing history may be provided by a search engine used by the user or by a software agent installed on the user's computer. The browsing history may include a plurality of sites that were visited, how many times an individual site of the plurality of sites was visited, and an average length of time that the individual site of the plurality of sites was visited. The operations may include identifying activities performed prior to purchasing a device in the browsing history, such as, for example, navigating to a product site associated with the device, navigating to an additional product site associated with an additional device that is similar to the device, navigating to a first review site that includes a review of the device, navigating to a second review site that includes a second review associated with the additional device, navigating to a comparison site that includes a comparison of the device to the additional device, and the like.

The operations may include determining, based on the activities, a priority corresponding to individual features. For example, features with a high priority (e.g., primary features) may be features that the user has spent a relatively large amount of time researching, e.g., based on the how many times a site associated with the feature was visited, how long the user spent on the site, an amount of time the user spends selecting particular product images, which particular hypertext links in the product pages that the user selects, a time spent on a particular section of a product page (e.g., selecting a specification tab and scrolling down to a view a particular portion of the specification), and the like. The features may include a price of the device, a type of processor (e.g., Intel® i3, i5, i7), an amount of random-access memory (RAM), a storage capacity of a drive (e.g., hard drive or SSD), a display size (e.g., 12.5", 13", 14" 155", 17" or the like) of a display device, a display resolution (e.g., 720p, 1080p, 4k, or the like) of the display device, a touch screen capability of the display device, a battery life of the device, a number of ports, a type (e.g., USB 3.0 or USB 2.0, USB Type C or USB Type A, HDMI or VGA, or the like) of one or more of the ports, a weight of the device, or one or more dimensions (e.g., length, width, and thickness) of the device. In some cases, the features may be classified as primary, secondary, and tertiary based on the corresponding priority of each feature. For example, for a commuter, the weight and size of the device may be a high priority (e.g., primary features). As another example, for someone who travels frequently, battery life may be a high priority (e.g., primary feature). As a further example, for someone who does video editing or photo editing, a screen size and a screen resolution may be a high priority (e.g., primary features). The operations may include modifying the configuration of the device based on the features, starting with the lowest priority (e.g., tertiary) features and progressively modifying features having a higher priority to modify (e.g., reduce) a price of the configuration to create a modified price that differs from the target (or maximum) price by less than a predetermined amount. The operations may include using a machine learning algorithm to determine a configuration of the device based on the features and their corresponding priorities. For example, the machine learning algorithm may create a weighted overlay for conjoint analysis data associated with the device and determine the configuration of the device based at least in part on the weighted overlay. To illustrate, features that are predicted (e.g., based on the browser history) to be of greater interest (e.g., higher priority) to the user may be weighted higher than features of lesser importance (e.g., lower priority). In some cases, the weighting (e.g., based on the priority) may be partially based on how much time the user spends researching a particular feature. For example, if the browser history indicates that the user has spent a most amount of time researching extended life batteries, then battery life may have a higher priority and may be weighted higher than other features.

The operations may include creating a web page describing a specification of the device based on the configuration. The operations may include performing a comparison of at least some of the features (e.g., top M features in descending order of priority, where M>0, such as M=5 or M=10) of the device with other features of similar devices and including the comparison in the web page. The operations may include sending a notification (e.g., email, push notification) to a browser of the user. The operations may include receiving, via the web page, one or modifications to the configuration, modifying the configuration based at least in part on the one or more modifications to create a modified configuration, and modifying the price based at least in part on the one or more modifications. The operations may include receiving a purchase order to purchase the device having the configuration or the modified configuration based on the primary features of the device that are of primary importance to the user and instructing a manufacturing facility to build and ship the device to the user.

Figure 1:
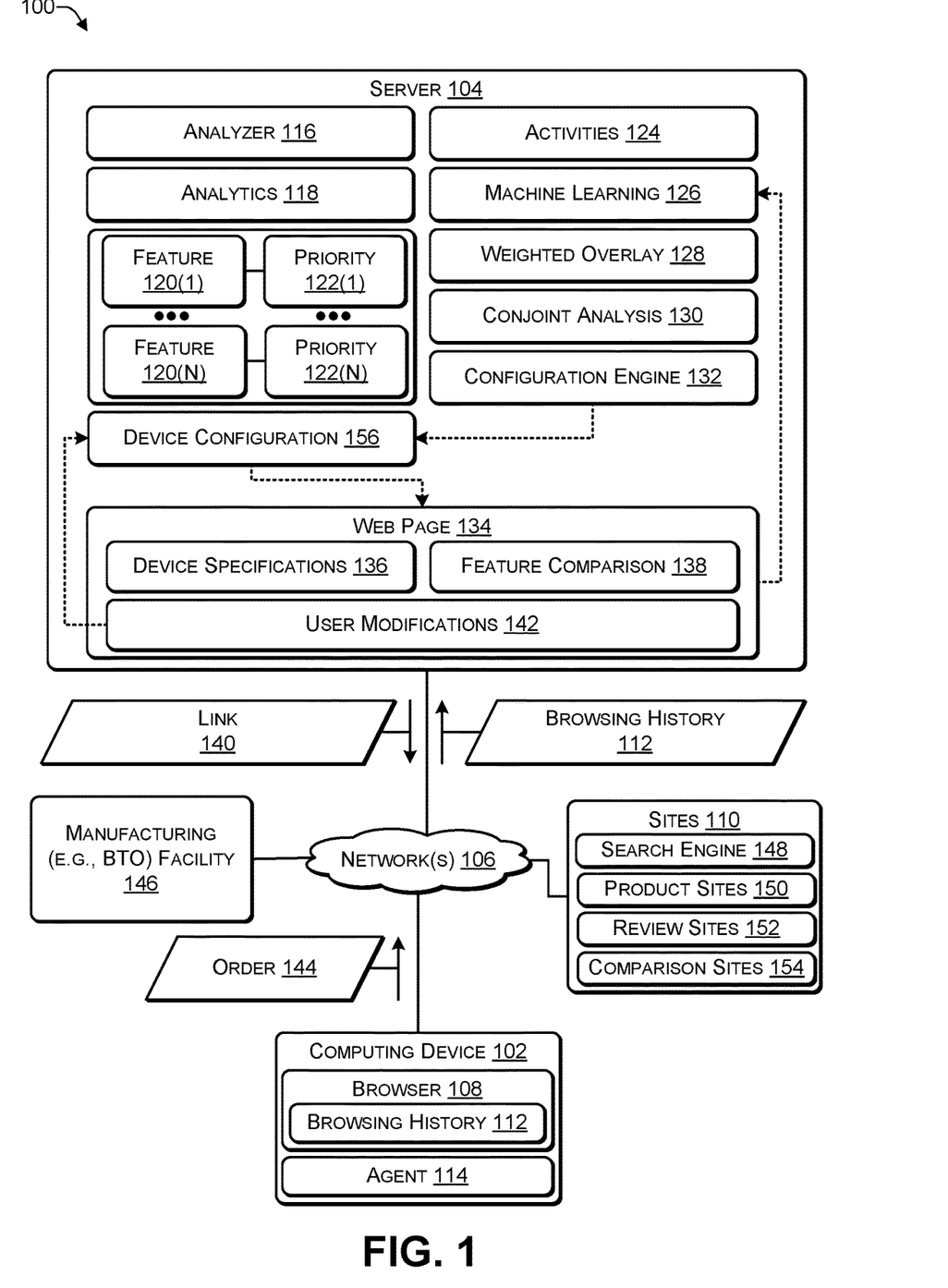
FIG. 1 is a block diagram of a system to predict a configuration of a device based on a browsing history, according to some embodiments.

FIG. 1 is a block diagram of a system 100 to predict a configuration of a device based on a browsing history, according to some embodiments. The system 100 may include a computing device 102 coupled to a server 104 via a network 106.

A user of the computing device 102 may open a browser 108 and navigate to various sites 110. The user may use the browser 108 to perform research prior to purchasing a device, such as a computing device (e.g., a laptop, a desktop, a tablet, a smartphone, or the like). For example, when performing the research, the user may visit a site hosted by a search engine 148, one or more product sites 150 (e.g., hosted by a product manufacturer, such as Dell®, HP®, Lenovo®, Acer®, or the like), one or more product review sites 152, one or more product comparison sites 154, or any combination thereof. Information about how the user uses the browser 108, including which sites are visited, how often each site is visited, how much time is spent at each site that is visited, and other browsing related information may be stored in a browsing history 112 of the browser 108.

The browsing history 112 may be provided to the server 104. For example, in some cases, a software agent 114 installed on the computing device 102 (e.g., by a manufacturer of the computing device 102) may send the browsing history 112 from the computing device 102 to the server 104. In other cases, the search engine 148 may provide (e.g., sell) the browsing history 112 to a manufacturer associated with the server 104.

The server 104 may use an analyzer 116 to analyze the browsing history 112 to identify activities 124 (e.g., in the browsing history 112) that are related to purchasing a device and determine analytics 118 associated with the activities 124. For example, the analytics 118 may include information associated with the sites 110 that were visited, how many times each of the sites 110 was visited, an average length of time that each of the sites 110 was visited, and the like. The activities 124 identified as pre-purchase activities may include, for example, viewing the product sites 150 associated with devices that the user is interested in acquiring (e.g., leasing or purchasing), reading online reviews on the review sites 152, reading comparisons of multiple devices on comparison sites 154, and the like.

The analyzer 116 may use the activities 124 and the analytics 118 to determine features 120 that are of interest to the user and to determine a corresponding priority 122 for each of the features 120. For example, the features 120 may include a target (or maximum) price that the user desires to pay for the device, a type of processor (e.g., Intel® i3, i5, or i7), an amount of random-access memory (RAM), a storage capacity (e.g., of a disk drive or a solid-state drive), a display size of a display device (e.g., 14" display device, 15" display device, or 17" display device), a display resolution (e.g., 720p, 1080p, 4k, or the like) of the display device, whether the display device has a touch screen or a non-touch screen, a battery life of a portable device, a number of ports, types of ports (e.g., universal serial bus (USB) 3.0 or USB 2.0, USB Type C or USB Type A, High-Definition Multimedia Interface (HDMI), video graphics adapter (VGA), or the like), weight, size (e.g., particularly thickness), and the like. The corresponding priority 122 of each of the features 120 may be determined based on the activities 124 and the analytics 118. For example, the number of sites that are visited and the amount of time spent on each of the visited sites to research a particular feature may be used to determine a priority of the particular feature. In some cases, a three-priority system (e.g., high, medium, low) may be used to classify the features 120 as primary features, secondary features, and tertiary features. Of course, more than three priority levels or less than three priority levels may be used for the priorities 122.

A machine learning algorithm 126 may be used to create, based on the features 120 and the priorities 122, a weighted overlay 128 that is used to overlay a conjoint analysis 130. Conjoint analysis 130 is a survey-based statistical technique used to determine how a large population prioritizes each of the features 120 associated with a computing device. In some cases, the conjoint analysis 130 may include multiple data sets associated with multiple device types, e.g., a first conjoint analysis associated with a smartphone device, a second conjoint analysis associated with a tablet device, a third conjoint analysis associated with a laptop device, a fourth conjoint analysis associated with a desktop device, and so on. The conjoint analysis 130 identifies what combination of a limited number of features is most influential on a user's decision making to purchase a particular device. Of course, the conjoint analysis 130 is merely an example and another type of analysis tool (e.g., Brand-Price Trade-Off, Simalto, analytic hierarchy process (AHP), evolutionary algorithms, rule-developing experimentation or the like) may be used instead of the conjoint analysis 130.

The result of using the weighted overlay 128 with the conjoint analysis 130 may be provided to a configuration engine 132. The configuration engine 132 may generate a device configuration 156, substantially in real-time, based on the weighted overlay 128 and the conjoint analysis 130 and determine an associated price. If the price of the device configuration 136 is more than a threshold amount (e.g., 5%, 3%, 1% or the like) greater than the target (or maximum) price that the user desires to pay for a device (e.g., as determined based on analyzing the browsing history 112), then the configuration engine 132 may adjust the features 120 to adjust the device configuration 156 and the associated price. For example, if the target price is $1000 and the threshold is 2%, then the configuration algorithm may stop when the price is between $980 and $1020. To illustrate, the configuration engine 132 may select a different platform that has a price range with a lower starting price than the currently selected platform. To illustrate, a manufacturer may offer multiple platforms, including a consumer platform (e.g., Dell® Inspiron), a business platform (e.g., Dell® Vostro), an Enterprise platform (e.g., Dell® Latitude), an ultralight platform (e.g., Dell® XPS), a gaming platform (e.g., Dell® Alienware), a workstation platform (e.g., Dell® Precision), and the like. The consumer platform may have the cheapest price range (e.g., $200-$600), the business platform may have a higher price range (e.g., $400-$600), the Enterprise platform may have an even higher price range (e.g., $500-$1200), the ultralight platform may be more expensive still (e.g., $900-$1400), the gaming platform may have an even higher range ($1400-$2400), and the workstation platform may have the most expensive range (e.g., $900-$4,000). Note that a price range of one platform may overlap a portion of a price range of at least one other platform. To adjust the price, the configuration engine 132 may adjust the device configuration 156 by switching from one platform (e.g., an Enterprise platform) to another platform (e.g., a business platform) with a lower price range. The configuration engine 132 may repeatedly adjust the features 120 (of the device configuration 156) based on the corresponding priorities 122, starting with the lowest priority features, until the associated price is within a predetermined threshold of the target (or maximum) price. For example, the configuration engine 132 may select a different platform, reduce an amount of RAM, reduce a size of the storage drive (e.g., hard drive or SSD), select a processor with a lower clock speed (e.g., 3.4 gigahertz (GHz) instead of 3.8 GHz), select a smaller display (e.g., 15" instead of 17" or 14" instead of 15"), perform another adjustment, or any combination thereof to adjust (e.g., lower) the device configuration 156 and the associated price to be within the predetermined threshold of the target (or maximum) price.

After the configuration engine 132 has finalized the device configuration 156, the server 104 may create a web page 134 that includes device specifications 136 associated with the device configuration 156. The web page may include a feature comparison 138 that compares at least a portion (e.g., top 5, top 10 or the like) of the features 120 with the features of similar devices manufactured by competing manufacturers. For example, the feature comparison 138 may indicate that the features of the device configuration 156 are more suited for the user's preferences (e.g., as determined using the browsing history 112) than the competing devices. The server 104 may send a notification with a link 140 to the web page 134 to the browser 108 (e.g., via email, a browser push notification, or other mechanism).

After receiving the link 140, the user may select the link 140 to visit the web page 134 to view the device specifications 136 and the feature comparison 138. The web page 134 may enable the user to provide user modifications 142 to modify the device configuration 156 and the device specifications 136. For example, if the user's priorities have changed after the server 104 received the browsing history 112, then the user may provide the user modifications 142 to reflect the changes in priorities.

If the user desires to purchase the device configuration 156 with the device specifications 136 provided in the web page 134, the user may send an order 144 from the computing device 102 to the server 104. The server 104 may send the information associated with the order 144 (e.g., the device configuration 156, a shipping address of the user, and the like) to a BTO manufacturing facility 146 that can manufacture a device based on the device configuration 156. The manufacturing facility 146 may manufacture a device based on the device configuration and ship the device to the user's address.

The final device configuration 156 (e.g., after the user modifications 142) may be used to further train the machine learning algorithm 126. For example, user priorities may change based on new technologies, social media, and the like. Each time a device with the device configuration 156 is purchased, the device configuration 156 and the user modifications 142 may be stored in a database. The stored information may be used as part of the training data to periodically (e.g., every X months, where X>0) re-train the machine learning algorithm 126.

Thus, a user may use a web browser to perform various activities prior to purchasing a device, such as visiting product sites, visiting product review sites, and visiting comparison sites. The pre-purchase activities may be stored in a browsing history of the browser. A server (e.g., associated with a device manufacturer) may obtain the browsing history and analyze the browsing history to determine which of the features of the device are of interest to the user and determine a corresponding priority for each of the features. Based on information in the browsing history, including how frequently particular sites are visited, how long each site is visited, an amount of time the user spends selecting particular product images, which hypertext links in the product pages that the user selects, a time spent on a particular section of a product page (e.g., selecting specification and scrolling down to a view a particular portion of the specification), and the like, the server may determine the features and the corresponding priority, substantially in real-time (e.g., less than three seconds) of each of the features. A machine learning algorithm may use the features and their corresponding priorities to predict, substantially in real-time, a configuration of a device that the user would likely purchase. For example, the machine learning algorithm may create a weighted overlay based on the features and the priorities and use the weighted overlay with conjoint analysis to predict the configuration of the device. A configuration engine may use the predicted configuration to create a device configuration that a device manufacturer (e.g., associated with the server) is capable of building using existing device platforms (e.g., consumer platform, business platform, Enterprise platform, ultralight platform, gaming platform, workstation platform, or the like). The configuration engine may adjust the configuration, including the device platform and the features, to adjust the price to be within a predetermined amount (or range) of a target (or maximum) price that the user is predicted (e.g., using machine learning analysis of the browsing history) to pay for a device. The server may create a web page based on the device configuration substantially in real-time, e.g., while the user is browsing to research a device on the internet. The web page may include a device specification associated with the device configuration and a feature comparison of the device with other similar (e.g., competing) devices. The server may electronically send a link to the web page to the user to enable the user to view the web page. The user may view the web page and, in some cases, provide user modifications to further modify the configuration. If the user is satisfied with the device configuration, then the user may send an order to the server to purchase the device. The server may instruct a BTO manufacturing facility to build the device according to the device configuration and ship the device to the user. In this way, a user's browsing history may be used to identify the user's feature priorities and to configure a device based on the feature priorities, thereby providing a customized device configuration that is suited to the user's needs. Because the user's browsing history is used, the user need not be tech savvy and need not provide detailed information.

Figure 2:
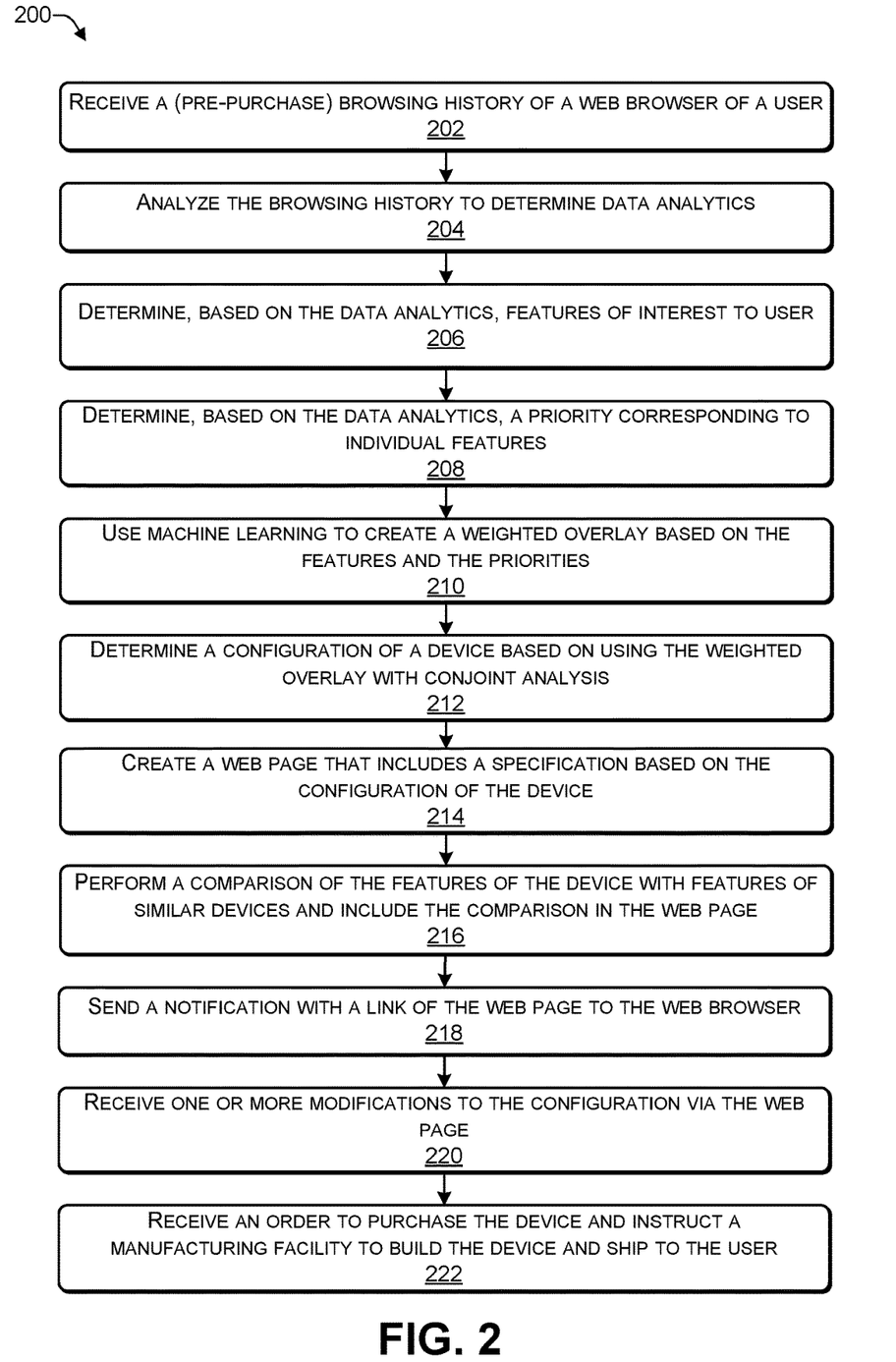
FIG. 2 is a flowchart of a process that includes determining data analytics, according to some embodiments.
Figure 3:
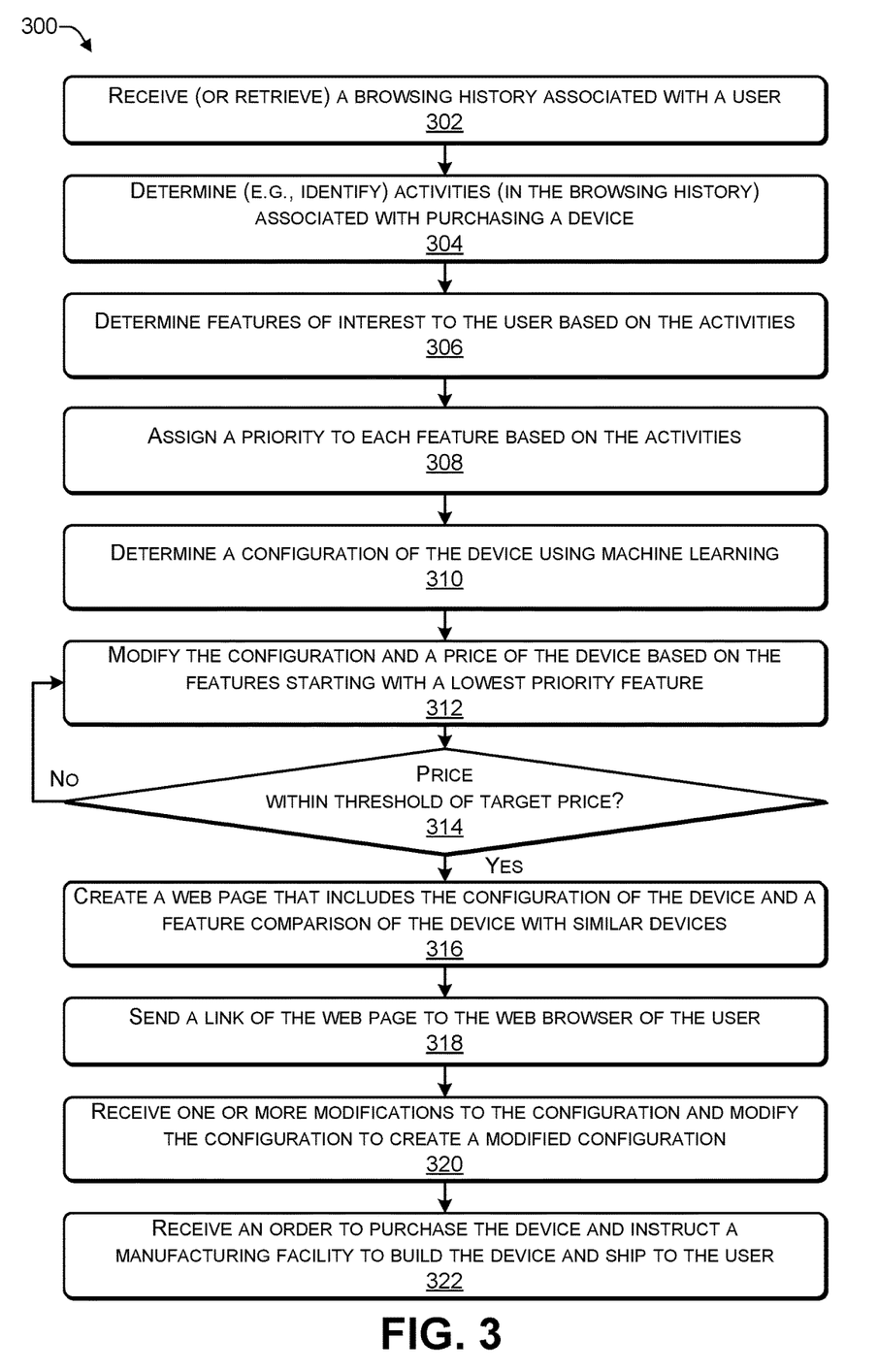
FIG. 3 is a flowchart of a process that includes determining activities, that are performed prior to purchasing a device, according to some embodiments.

In the flow diagrams of FIGS. 2 and 3, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 200 and 300 are described with reference to FIG. 1, as described above, although other models, frameworks, systems and environments may be used to implement these processes.

FIG. 2 is a flowchart of a process 200 that includes determining data analytics, according to some embodiments. For example, the process 200 may be performed by one or more components of the server 104 of FIG. 1.

At 202, a browsing history of a web browser associated with a user may be received. At 204, the browsing history may be analyzed to determine data analytics (e.g., including pre-purchase browsing activities). For example, in FIG. 1, the server 104 may receive the browsing history 112 associated with the browser 108. The server 104 may use the analyzer 116 to analyze the browsing history 112 to identify the activities 124 that are related to purchasing a device and determine analytics 118 associated with the activities 124. For example, the analytics 118 may include information associated with the sites 110 that were visited, how many times each of the sites 110 was visited, an average length of time that each of the sites 110 was visited, and the like.

At 206, features of interest to the user may be determined based on the data analytics. At 208, a corresponding priority may be determined for individual features based on the data analytics. For example, the analyzer 116 may use the analytics 118 to determine the features 120 in which the user is interested and the corresponding priority 122 of each of the features 120. For example, the features 120 and the priorities 122 may be determined based on the sites 110, such as, for example, a length of time spent on each of the sites 110, an amount of time the user spends selecting particular product images on the sites 110, which hypertext links in sites 110 that the user selects, a time spent on a particular section of the sites 110 (e.g., selecting specification and scrolling down to a view a particular portion of the specification), and the like.

At 210, a machine learning algorithm may be used to create, based on the features and their corresponding priorities, a weighted overlay. At 212, the weighted overlay may be used with conjoint analysis to determine (e.g., predict) a configuration of a device. For example, in FIG. 1, the machine learning algorithm 126 may create, based on the features 120 and the priorities 122, the weighted overlay 128 to overlay the conjoint analysis 130. The result of using the weighted overlay 128 with the conjoint analysis 130 may be provided to the configuration engine 132. The configuration engine 132 may generate the device configuration 156, substantially in real-time (e.g., less than 3 seconds after receiving the browsing history 112), based on the weighted overlay 128 and the conjoint analysis 130. The device configuration 156 may be a configuration that is predicted to be purchased by the user, based on the features 120 and the priorities 122 identified in the browsing history 112.

At 214, a web page that includes a specification based on the configuration of the device may be created. At 216, a comparison of the features of the device to the features of similar (e.g., competing) devices may be performed and included in the web page. For example, in FIG. 1, the server 104 may create the web page 134 that includes the device specifications 136 associated with the device configuration 156. The web page may include the feature comparison 138 that compares at least a portion (e.g., top M, where M>0) of the features 120 with the features of similar devices manufactured by competing manufacturers. For example, the feature comparison 138 may indicate that the features of the device configuration 156 are more suited for the user's preferences (e.g., as determined using the browsing history 112) than the competing devices.

At 218, a notification that includes a link to the web page may be sent to the browser of the user. At 220, in some cases, one or more modifications to the configuration may be received via the web page. At 222, an order to purchase the device may be received and a BTO manufacturing facility may be instructed to build the device based on the configuration and ship the device to the user. For example, in FIG. 1, the server 104 may send a notification with a link 140 to the web page 134 to the browser 108 (e.g., via email, a browser push notification, or other mechanism). After receiving the link 140, the user may select the link 140 to visit the web page 134 to view the device specifications 136 and the feature comparison 138. The web page 134 may enable the user to provide user modifications 142 to modify the device configuration 156 and the device specifications 136. If the user desires to purchase the device configuration 156 with the device specifications 136 provided in the web page 134, the user may send the order 144 from the computing device 102 to the server 104. The server 104 may send the information associated with the order 144 (e.g., the device configuration 156, a shipping address of the user, and the like) to the BTO manufacturing facility 146 that can manufacture a device based on the device configuration 156. The manufacturing facility 146 may manufacture a device based on the device configuration and ship the device to the user's address.

Thus, a user may use a web browser to perform various activities prior to purchasing a device, such as visiting product sites, visiting product review sites, and visiting comparison sites. The pre-purchase activities may be stored in a browsing history of the browser. A server (e.g., associated with a device manufacturer) may obtain the browsing history and analyze the browsing history to determine which of the features of the device are of interest to the user and determine a corresponding priority for each of the features. A machine learning algorithm may use the features and their corresponding priorities to predict a configuration of a device that the user would likely purchase. For example, the machine learning algorithm may create a weighted overlay based on the features and the priorities and use the weighted overlay with conjoint analysis to predict the configuration of the device. A configuration engine may use the predicted configuration to create a device configuration. The configuration engine may repeatedly adjust (starting with the lowest priority feature) the configuration, including the device platform and the features, to adjust the price to be within a predetermined amount of a target (or maximum) price that the user is predicted (e.g., using machine learning analysis of the browsing history) to pay for a device. The server may create a web page based on the device configuration. The web page may include a device specification associated with the device configuration and a feature comparison of the device with other similar (e.g., competing) devices. The server may electronically send a link to the web page to the user to enable the user to view the web page. The user may view the web page and, in some cases, provide user modifications to further modify the configuration. After the user is satisfied with the device configuration, the user may send an order to the server to purchase the device. The server may instruct a BTO manufacturing facility to build the device according to the device configuration and ship the device to the user. In this way, a user's browsing history may be used to identify the user's feature priorities and to configure a device based on the feature priorities, thereby providing a customized device configuration that is suited to the user's needs.

FIG. 3 is a flowchart of a process 300 that includes determining activities, that are performed prior to purchasing a device, according to some embodiments. For example, the process 300 may be performed by one or more components of the server 104 of FIG. 1.

At 302, a browsing history of a web browser associated with a user may be received. At 304, the browsing history may be analyzed to determine activities associated with purchasing a device. For example, in FIG. 1, the server 104 may receive the browsing history 112 associated with the browser 108. The server 104 may use the analyzer 116 to analyze the browsing history 112 to identify the activities 124 that are related to purchasing a device such as navigating the browser to one or more product sites 150 (e.g., hosted by a product manufacturer, such as Dell®, HP®, Lenovo®, Acer®, or the like), navigating the browser to one or more product review sites 152, navigating the browser to one or more product comparison sites 154, or any combination thereof. For example, the analyzer 116 may determine information associated with the sites 110 that were visited, such as, for example, how many times each of the sites 110 was visited, an average length of time that each of the sites 110 was visited, an amount of time the user spends selecting particular product images on each of the sites 110, which hypertext links in the product pages on each of the sites 110 that the user selects, a time spent on a particular section of a product page (e.g., selecting specification and scrolling down to a view a particular portion of the specification) of the sites 110, and the like.

At 306, features of interest to the user may be determined based on the activities. At 308, a corresponding priority may be assigned to individual features based on the activities. For example, in FIG. 1, the analyzer 116 may determine the features 120 in which the user is interested and the corresponding priority 122 of each of the features 120 based on how many times each of the sites 110 was visited and a length of time spent on each of the sites 110. For example, a first site (e.g., associated with Intel®) that was visited 3 times and where the user spent an average of 5 minutes per visit may give more weight to features discussed on the first site as compared to features discussed at a second site (e.g., associated with AMD®) that was visited 3 times and where the user spent an average of 2 minutes per visit. In this example, the analyzer 116 may determine that the user prefers Intel® processors to AMD® processors and give a higher priority to devices featuring Intel® processors relative to device featuring AMD® processors.

At 310, a machine learning algorithm may be used to determine (e.g., predict substantially in real-time) a configuration of a device. For example, in FIG. 1, the machine learning algorithm 126 may create, based on the features 120 and the priorities 122, the weighted overlay 128 to overlay the conjoint analysis 130. The result of using the weighted overlay 128 with the conjoint analysis 130 may be provided to the configuration engine 132. The configuration engine 132 may generate the device configuration 156 based on the weighted overlay 128 and the conjoint analysis 130. The device configuration 156 may be a configuration that is predicted to be purchased by the user, based on the features 120 and the priorities 122 identified in the browsing history 112.

At 312, the configuration and price of the device may be modified based on the features, starting with a lowest priority feature. At 314, a determination may be made whether the price is within a predetermined threshold of a target price (or price range). If a determination is made, at 314, that "no" the price is not within the predetermined threshold of the target price (or price range), then the process may proceed to 312. The process may repeat 312 and 314 until the price is within a predetermined threshold of a target price. For example, in FIG. 1, the configuration engine 132 may generate a device configuration 156 based on the weighted overlay 128 and the conjoint analysis 130 and determine an associated price. If the price of the device configuration 136 is more than a threshold amount (e.g., 5%, 3%, 1% or the like) greater than the target (or maximum) price that the user desires to pay for a device (e.g., as determined based on analyzing the browsing history 112), then the configuration engine 132 may repeatedly adjust the features 120, starting with the lowest priority feature, to adjust the device configuration 156 and the associated price. For example, to adjust the price, the configuration engine 132 may adjust the device configuration 156 by switching from one platform (e.g., an Enterprise platform) to another platform (e.g., a business platform) with a lower price range. The configuration engine 132 may repeatedly adjust the features 120 (of the device configuration 156) based on the corresponding priorities 122, starting with the lowest priority feature, until the associated price is within a predetermined threshold of the target (or maximum) price. For example, assume F1, F2, F3, F4, and F5 are features, where the numbers 1 to 5 indicates the corresponding priority of the feature, with 1 being the lowest priority and 5 being the highest priority. The configuration engine 132 may adjust F1 and check the price, adjust F2 and check the price, adjust F3 and check the price, adjust F4 and check the price and so on. The configuration engine 132 may stop when the price is determined to be within a threshold amount of a target price. The configuration engine 132 may adjust various features, including selecting a different platform, reducing an amount of RAM, reducing a size of the storage drive (e.g., hard drive or SSD), selecting a processor with a slower clock speed (e.g., 3.4 gigahertz (GHz) instead of 3.8 GHz), selecting a smaller display (e.g., 15" instead of 17" or 14" instead of 15"), performing another adjustment, or any combination thereof to adjust (e.g., lower) the device configuration 156.

If a determination is made, at 314, that "yes" the price is within the predetermined threshold (or price range) of (e.g., above or below) the target price, then the process may proceed to 316. At 316, a web page that includes (1) a specification based on the configuration of the device and (2) a comparison of the features of the device to the features of similar (e.g., competing) devices may be created (e.g., substantially in real-time). For example, in FIG. 1, the server 104 may create the web page 134 that includes the device specifications 136 associated with the device configuration 156. The web page may include the feature comparison 138 that compares at least a portion (e.g., top M, where M>0) of the features 120 with the features of similar devices manufactured by competing manufacturers. For example, the feature comparison 138 may indicate that the features of the device configuration 156 are more suited for the user's preferences (e.g., as determined using the browsing history 112) than the competing devices.

At 318, a notification that includes a link to the web page may be sent to the browser of the user. At 320, in some cases, one or more modifications to the configuration may be received via the web page and the configuration modified accordingly. At 322, an order to purchase the device may be received and a BTO manufacturing facility may be instructed to build the device based on the configuration and ship the device to the user. For example, in FIG. 1, the server 104 may send a notification with a link 140 to the web page 134 to the browser 108 (e.g., via email, a browser push notification, or other mechanism). After receiving the link 140, the user may select the link 140 to visit the web page 134 to view the device specifications 136 and the feature comparison 138. The web page 134 may enable the user to provide user modifications 142 to modify the device configuration 156 and the device specifications 136. If the user desires to purchase the device configuration 156 with the device specifications 136 provided in the web page 134, the user may send the order 144 from the computing device 102 to the server 104. The server 104 may send the information associated with the order 144 (e.g., the device configuration 156, a shipping address of the user, and the like) to the BTO manufacturing facility 146 that can manufacture a device based on the device configuration 156. The manufacturing facility 146 may manufacture a device based on the device configuration and ship the device to the user's address.

Thus, a user may use a web browser to perform various activities prior to purchasing a device, such as visiting product sites, visiting product review sites, and visiting comparison sites. The pre-purchase activities may be stored in a browsing history of the browser. A server (e.g., associated with a device manufacturer) may obtain the browsing history and analyze the browsing history to determine which of the features of the device are of interest to the user and determine a corresponding priority for each of the features. For example, the priority may be determined based on which sites the user visited, an average amount of time that the user spent at each site, an amount of time the user spends selecting particular product images, which hypertext links in the product pages that the user selects, a time spent on a particular section of a product page (e.g., selecting specification and scrolling down to a view a particular portion of the specification), and the like. A machine learning algorithm may use the features and their corresponding priorities to predict, substantially in real-time (e.g., within 3 seconds of receiving the browsing history), a configuration of a device that the user would likely purchase. For example, the machine learning algorithm may create a weighted overlay based on the features and the priorities and use the weighted overlay with conjoint analysis to predict the configuration of the device. A configuration engine may use the predicted configuration to create a device configuration. The configuration engine may repeatedly adjust (starting with the lowest priority feature) the configuration, including the device platform and the features, to adjust the price to be within a predetermined amount of a target (or maximum) price that the user is predicted (e.g., using machine learning analysis of the browsing history) to pay for a device. The server may create a web page based on the device configuration. The web page may include a device specification associated with the device configuration and a feature comparison of the device with other similar (e.g., competing) devices. The server may electronically send a link to the web page to the user to enable the user to view the web page. The user may view the web page and, in some cases, provide user modifications to further modify the configuration. After the user is satisfied with the device configuration, the user may send an order to the server to purchase the device. The server may instruct a BTO manufacturing facility to build the device according to the device configuration and ship the device to the user. In this way, a user's browsing history may be used to identify the user's feature priorities and to configure a device based on the feature priorities, thereby providing a customized device configuration that is suited to the user's needs.

Figure 4:
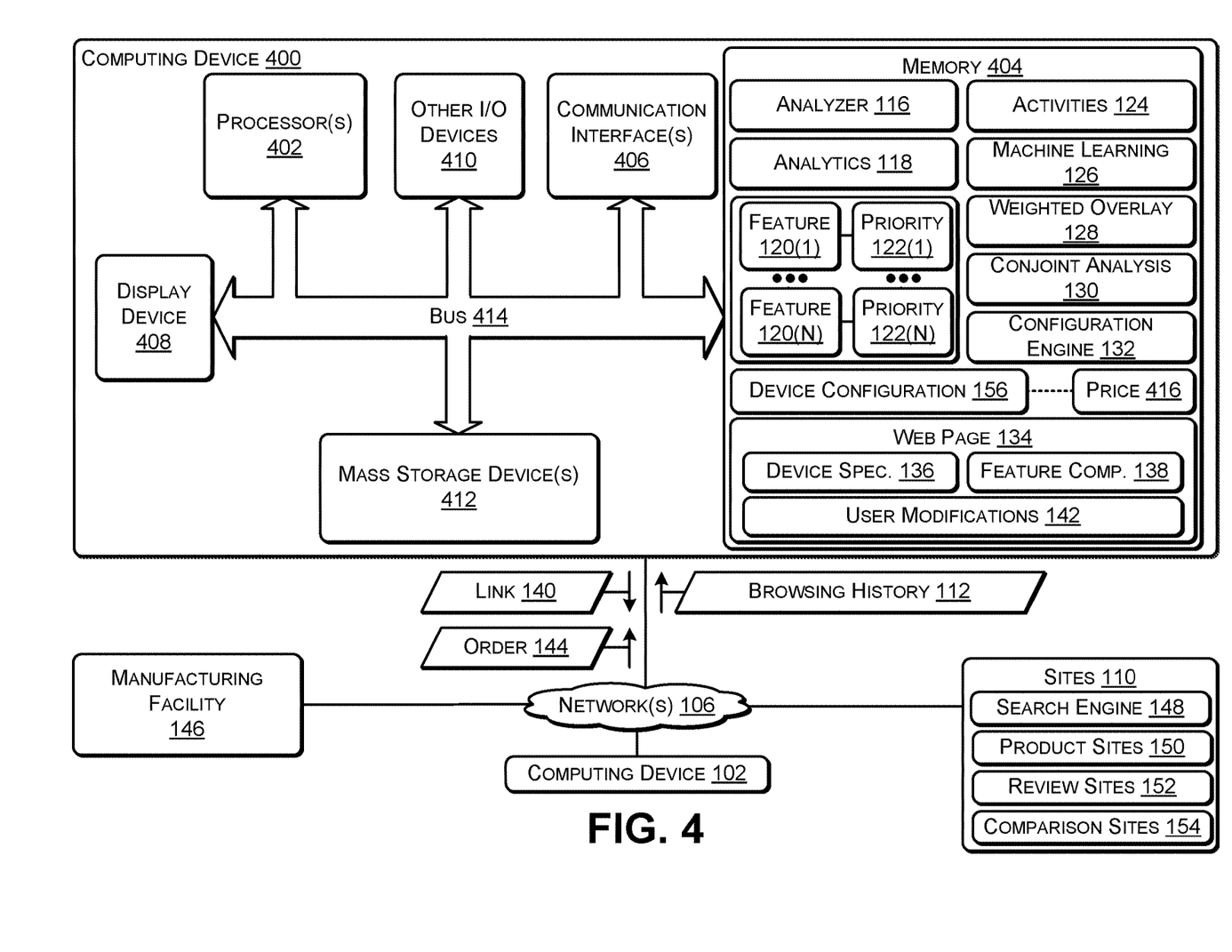
FIG. 4 illustrates an example configuration of a computing device that can be used to implement the systems and techniques described herein.

FIG. 4 illustrates an example configuration of a computing device 400 that can be used to implement the systems and techniques described herein, such as for example, the computing device 102 or the server 104 of FIG. 1. For illustration purposes, the computing device 400 is shown in FIG. 4 as implementing the server 104 of FIG. 1.

The computing device 400 may include one or more processors 402 (e.g., CPU, GPU, or the like), a memory 404, communication interfaces 406, a display device 408, other input/output (I/O) devices 410 (e.g., keyboard, trackball, and the like), and one or more mass storage devices 412 (e.g., disk drive, solid state disk drive, or the like), configured to communicate with each other, such as via one or more system buses 414 or other suitable connections. While a single system bus 414 is illustrated for ease of understanding, it should be understood that the system buses 414 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 402 are one or more hardware devices that may include a single processing unit or a number of processing units, all of which may include single or multiple computing units or multiple cores. The processors 402 may include a graphics processing unit (GPU) that is integrated into the CPU or the GPU may be a separate processor device from the CPU. The processors 402 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 402 may be configured to fetch and execute computer-readable instructions stored in the memory 404, mass storage devices 412, or other computer-readable media.

Memory 404 and mass storage devices 412 are examples of computer storage media (e.g., memory storage devices) for storing instructions that can be executed by the processors 402 to perform the various functions described herein. For example, memory 404 may include both volatile memory and non-volatile memory (e.g., RAM, ROM, or the like) devices. Further, mass storage devices 412 may include hard disk drives, solid-state drives, removable media, including external and removable drives, memory cards, flash memory, floppy disks, optical disks (e.g., CD, DVD), a storage array, a network attached storage, a storage area network, or the like. Both memory 404 and mass storage devices 412 may be collectively referred to as memory or computer storage media herein and may be any type of non-transitory media capable of storing computer-readable, processor-executable program instructions as computer program code that can be executed by the processors 402 as a particular machine configured for carrying out the operations and functions described in the implementations herein.

The computing device 400 may include one or more communication interfaces 406 for exchanging data via the network 106. The communication interfaces 406 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 406 can also provide communication with external storage, such as a storage array, network attached storage, storage area network, cloud storage, or the like.

The display device 408 may be used for displaying content (e.g., information and images) to users. Other I/O devices 410 may be devices that receive various inputs from a user and provide various outputs to the user, and may include a keyboard, a touchpad, a mouse, a printer, audio input/output devices, and so forth.

The computer storage media, such as memory 404 and mass storage devices 412, may be used to store software and data. For example, the computer storage media may be used to store the analyzer 116, the analytics 118, the features 120, the priorities 122, the activities 124, the machine learning 126, the weighted overlay 128, the conjoint analysis 130, the configuration engine 132, and the device configuration 156.

Thus, a user may use a web browser of the computing device 102 to perform various activities prior to purchasing a device, such as visiting the product sites 150, visiting the product review sites 152, and visiting the comparison sites 154. The pre-purchase activities may be stored in the browsing history 112 of the browser. A server (e.g., the computing device 400) may obtain the browsing history 112 and analyze the browsing history 112 using the analyzer 116 to determine which of the features 120 of the device are of interest to the user and determine a corresponding priority 122 for each of the features 120. For example, the priority may be determined based on which of the sites 110 the user visited and an average amount of time that the user spent at each of the sites 110. The machine learning algorithm 126 may use the features 120 and their corresponding priorities 122 to predict the device configuration 156 that the user would likely purchase. For example, the machine learning algorithm 126 may create the weighted overlay 128 based on the features 120 and the priorities 122 and use the weighted overlay 128 with the conjoint analysis 130 to predict the device configuration 156. The configuration engine 132 may repeatedly adjust the features 120 (starting with the lowest priority feature) of the device configuration 156, to adjust an associated price 416 to be within a predetermined amount of a target (or maximum) price that the user is predicted (e.g., based on the browsing history 112) to pay for a device. The server may create the web page 134 based on the device configuration 156. The web page 134 may include the device specification 136 associated with the device configuration 156 and the feature comparison 138 of the device with other similar (e.g., competing) devices. The server may electronically send the link 140 to the web page 134 to the user to enable the user to view the web page 134. The user may view the web page 134 and, in some cases, provide the user modifications 142 to further modify the device configuration 156. After the user is satisfied with the device configuration 156, the user may send the order 144 to the server to purchase the device. The server may instruct the manufacturing facility 146 to build the device according to the device configuration 156 and ship the device to the user. In this way, the user's browsing history 112 may be used to identify the user's feature priorities 120, 122 and to configure a device based on the feature priorities 120, 122, thereby providing a customized device configuration that is suited to the user's needs.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
  receiving, by one or more processors, a browsing history associated with a browser used by a user;
  determining, by the one or more processors and based on the browsing history, activities performed prior to purchasing a device;
  determining, by the one or more processors and based on the activities, a plurality of features of the device that are of interest to the user;
  determining, by the one or more processors and based on the activities, a corresponding priority of individual features of the plurality of features;
  creating, using a machine learning algorithm, a weighted overlay based on the individual features of the device and the corresponding priority of the individual features;
  overlaying the weighted overlay with a conjoint analysis associated with the individual features of the device, wherein the conjoint analysis includes a survey-based statistical analysis of how consumers value different features of the device; and
  determining a configuration of the features of the device based at least in part on the weighted overlay and the conjoint analysis;
  creating, by the one or more processors and based on the configuration, a web page describing a specification of the device, wherein the web page comprises a feature comparison between the configuration of the features of the device and features associated with at least one competing manufacturer, and wherein the web page indicates the configuration of the features of the device is more suitable than the features associated with the at least one competing manufacturer;
  sending, by the one or more processors, a notification that includes a link to the web page to a browser of the user;
  receiving, by the one or more processors, a purchase order to purchase the device; and
  instructing, by the one or more processors, a manufacturing facility to build and ship the device to the user.

2. The method of claim 1, further comprising:
  performing a comparison of at least a portion of the plurality of features of the device with other features of similar devices; and
  including the comparison in the web page.

3. The method of claim 1, wherein the plurality of features comprise at least two of: a price, a type of processor, an amount of random-access memory (RAM), a storage capacity of a drive, a display size of a display device, a display resolution of the display device, a touch screen capability of the display device, a battery life of the device, a number of ports, a type of one or more of the ports, a weight of the device, or one or more dimensions of the device.

4. The method of claim 1, further comprising:
  receiving, via the web page, one or more modifications to the configuration;
  modifying the configuration based at least in part on the one or more modifications; and
  modifying a price of the device based at least in part on the one or more modifications.

5. The method of claim 1, wherein the browsing history comprises:
  a plurality of sites that were visited;
  how many times an individual site of the plurality of sites was visited; and
  an average length of time that the individual site was visited.

6. The method of claim 1, wherein the activities comprise at least one of:
  navigating to a product site associated with the device;
  navigating to an additional product site associated with an additional device that is similar to the device;
  navigating to a first review site that includes a review of the device;
  navigating to a second review site that includes a second review associated with the additional device; or navigating to a comparison site that includes a comparison of the device to the additional device.

7. A computing device comprising:
one or more processors; and
one or more non-transitory computer readable media storing instructions executable by the one or more processors to perform operations comprising:
receiving a browsing history associated with a browser used by a user;
determining, based on the browsing history, activities performed prior to purchasing a device;
determining, based on the activities, a plurality of features of the device that are of interest to the user;
determining, based on the activities, a corresponding priority of individual features of the plurality of features;
creating, using a machine learning algorithm, a weighted overlay based on the individual features and the corresponding priority;
overlaying the weighted overlay with a conjoint analysis associated with the individual features of the device, wherein the conjoint analysis includes a survey-based statistical analysis of how consumers value different features of the device;
determining a configuration of the features of the device based at least in part on the weighted overlay and the conjoint analysis;
creating, based on the configuration, a web page describing a specification of the device including the features of the device, wherein the web page comprises a feature comparison between the configuration of the features of the device and features associated with at least one competing manufacturer, and wherein the web page indicates the configuration of the features of the device is more suitable than the features associated with the at least one competing manufacturer;
sending a notification that includes a link to the web page to a browser of the user;
receiving, by the one or more processors, a purchase order to purchase the device; and
instructing, by the one or more processors, a manufacturing facility to build and ship the device to the user.

8. The computing device of claim 7, wherein the operations further comprise:
performing a comparison of at least a portion of the plurality of features of the device with other features of similar devices, wherein the plurality of features comprise at least two of: a price, a type of processor, an amount of random-access memory (RAM), a storage capacity of a drive, a display size of a display device, a display resolution of the display device, a touch screen capability of the display device, a battery life of the device, a number of ports, a type of one or more of the ports, a weight of the device, or one or more dimensions of the device; and
including the comparison in the web page.

9. The computing device of claim 7, further comprising:
receiving, via the web page, one or more modifications to the configuration;
modifying the configuration based at least in part on the one or more modifications; and
modifying a price of the device based at least in part on the one or more modifications.

10. The computing device of claim 7, wherein the browsing history comprises:
a plurality of sites that were visited;
how many times an individual site of the plurality of sites was visited;
an average length of time that the individual site of the plurality of sites was visited;
a product page associated with the device;
an additional product page associated with an additional device that is similar to the device;
an online review associated with the device;
an additional online review associated with the additional device; or
an online comparison of the device with the additional device.

11. The computing device of claim 7, wherein the activities comprise at least one of:
navigating to a product site associated with the device;
navigating to an additional product site associated with an additional device that is similar to the device;
navigating to a first review site that includes a review of the device;
navigating to a second review site that includes a second review associated with the additional device; or
navigating to a comparison site that includes a comparison of the device to the additional device.

12. One or more non-transitory computer readable media storing instructions executable by one or more processors to perform operations comprising:
receiving a browsing history associated with a browser used by a user;
determining, based on the browsing history, activities performed prior to purchasing a device;
determining, based on the activities, a plurality of features of the device that are of interest to the user;
determining, based on the activities, a corresponding priority of individual features of the plurality of features;
creating, using a machine learning algorithm, a weighted overlay based on the individual features and the corresponding priority;
overlaying the weighted overlay with a conjoint analysis associated with the individual features of the device, wherein the conjoint analysis includes a survey-based statistical analysis of how consumers value different features of the device;
determining a configuration of the features of the device based at least in part on the weighted overlay and the conjoint analysis;
creating, based on the configuration, a web page describing a specification of the device, wherein the web page comprises a feature comparison between the configuration of the features of the device and features associated with at least one competing manufacturer, and wherein the web page indicates the configuration of the features of the device is more suitable than the features associated with the at least one competing manufacturer;
sending a notification that includes a link to the web page to a browser of the user;
receiving, by the one or more processors, a purchase order to purchase the device; and
instructing, by the one or more processors, a manufacturing facility to build and ship the device to the user.

13. The one or more non-transitory computer readable media of claim 12, wherein the operations further comprise:
modifying the configuration of the device based on the features of the device; and modifying a price of the configuration to create a modified price that differs from a target price by less than a predetermined amount.

14. The one or more non-transitory computer readable media of claim 13, wherein the plurality of features comprise at least two of: a price, a type of processor, an amount of random-access memory (RAM), a storage capacity of a drive, a display size of a display device, a display resolution of the display device, a touch screen capability of the display device, a battery life of the device, a number of ports, a type of one or more of the ports, a weight of the device, or one or more dimensions of the device.

15. The one or more non-transitory computer readable media of claim 12, wherein the operations further comprise:
receiving, via the web page, one or more modifications to the configuration;
modifying the configuration based at least in part on the one or more modifications; and
modifying a price of the device based at least in part on the one or more modifications.

16. The one or more non-transitory computer readable media of claim 12, wherein the browsing history comprises:
a plurality of sites that were visited;
how many times an individual site of the plurality of sites was visited; and
an average length of time that the individual site was visited.

17. The one or more non-transitory computer readable media of claim 12, wherein the activities comprise at least one of:
navigating to a product site associated with the device;
navigating to an additional product site associated with an additional device that is similar to the device;
navigating to a first review site that includes a review of the device;
navigating to a second review site that includes a second review associated with the additional device; or
navigating to a comparison site that includes a comparison of the device to the additional device.

* * * * *